US012567627B2

(12) United States Patent
Zhong et al.

(10) Patent No.: US 12,567,627 B2
(45) Date of Patent: Mar. 3, 2026

(54) BATTERY CELL, BATTERY, ELECTRICAL APPARATUS, AND METHOD AND SYSTEM FOR MANUFACTURING BATTERY CELL

(71) Applicant: CONTEMPORARY AMPEREX TECHNOLOGY (HONG KONG) LIMITED, Hong Kong (CN)

(72) Inventors: Qineng Zhong, Ningde City (CN); Yichen Wu, Ningde City (CN); Limei Yang, Ningde City (CN); Xiaomei Liu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/328,763

(22) Filed: Jun. 4, 2023

(65) Prior Publication Data

US 2023/0327243 A1     Oct. 12, 2023

Related U.S. Application Data

(63) Continuation of application No. PCT/CN2021/118881, filed on Sep. 16, 2021.

(51) Int. Cl.
| | |
|---|---|
| *H01M 50/538* | (2021.01) |
| *H01M 10/04* | (2006.01) |
| *H01M 50/107* | (2021.01) |
| *H01M 50/14* | (2021.01) |
| *H01M 50/152* | (2021.01) |
(Continued)

(52) U.S. Cl.
CPC ....... *H01M 50/14* (2021.01); *H01M 10/0404* (2013.01); *H01M 10/049* (2013.01);
(Continued)

(58) Field of Classification Search
CPC ............. H01M 50/107; H01M 50/152; H01M 50/154; H01M 50/213
See application file for complete search history.

(56) References Cited

U.S. PATENT DOCUMENTS

| | | | |
|---|---|---|---|
| 2015/0004446 A1* | 1/2015 | Kim .................... | H01M 50/325 |
| | | | 29/623.2 |
| 2021/0091438 A1* | 3/2021 | Backhaus ........... | H01M 50/253 |

FOREIGN PATENT DOCUMENTS

| | | | | |
|---|---|---|---|---|
| CN | 108281578 A | * | 7/2018 | ......... H01M 50/152 |
| CN | 211929598 U | | 11/2020 | |
(Continued)

OTHER PUBLICATIONS

Gong et al; "Cylindrical battery anti-vibration electrode cover plate"; Machine translation of CN108281578A obtained from ESpacenet Patent Translate (Year: 2018).*

(Continued)

*Primary Examiner* — Allison Bourke
*Assistant Examiner* — Charlene Bermudez
(74) *Attorney, Agent, or Firm* — K&L Gates LLP

(57) ABSTRACT

A battery cell, a battery, an electrical apparatus, and a method and a system for manufacturing a battery cell are provided. The battery cell comprises: a case having an opening; an electrode assembly provided within the case; an end cover assembly for closing the opening, wherein the end cover assembly comprises an end cover, an insulating member and a connection adapter member, the end cover is provided with an electrode terminal, and is configured to cover the opening and is connected to the case, the insulating member is provided on one side of the end cover facing the electrode assembly, and the connection adapter member is used for being electrically connected to the electrode terminal and to the electrode assembly; and a buffer member provided on one side of the insulating member facing the electrode assembly.

10 Claims, 7 Drawing Sheets

(51) Int. Cl.
    *H01M 50/486*     (2021.01)
    *H01M 50/533*     (2021.01)
    *H01M 50/579*     (2021.01)
    *H01M 50/59*     (2021.01)

(52) U.S. Cl.
    CPC ....... *H01M 50/107* (2021.01); *H01M 50/152* (2021.01); *H01M 50/486* (2021.01); *H01M 50/533* (2021.01)

(56)        References Cited

FOREIGN PATENT DOCUMENTS

| | | | |
|---|---|---|---|
| CN | 112310496 | A | 2/2021 |
| CN | 112310574 | A | 2/2021 |
| CN | 112332040 | A | 2/2021 |
| CN | 213583894 | U | 6/2021 |
| CN | 214336804 | U | 10/2021 |
| JP | 2006269354 | A | 10/2006 |
| JP | 2010170920 | A | 8/2010 |
| JP | 2012038705 | A | 2/2012 |
| KR | 20180093330 | A | 8/2018 |
| KR | 20210049595 | A | 5/2021 |

OTHER PUBLICATIONS

International Search Report received in the corresponding International Application PCT/CN2021/118881, mailed Jan. 20, 2022.
Office Action, mailed Sep. 19, 2025, for corresponding European Patent Application Serial No. 21956262.6.

* cited by examiner

BATTERY CELL, BATTERY, ELECTRICAL APPARATUS, AND METHOD AND SYSTEM FOR MANUFACTURING BATTERY CELL

CROSS REFERENCE TO RELATED APPLICATIONS

The present application is a continuation of International Application PCT/CN2021/118881, filed on Sep. 16, 2021 and entitled "BATTERY CELL, BATTERY, ELECTRICAL APPARATUS, AND METHOD AND SYSTEM FOR MANUFACTURING BATTERY CELL", the entire disclosure of which is incorporated herein by reference.

TECHNICAL FIELD

The present application relates to the technical field of batteries, and in particular to a battery cell, a battery, an electrical apparatus, and a method and a system for manufacturing a battery cell.

BACKGROUND ART

With economic development, battery technology is widely used in various fields, especially in the field of vehicles such as electric vehicles. In the battery technology, the service life of a battery is directly related to the performance of a vehicle such as driving range, convenience of use, and the like.

When the service life of a battery is too short, it tends to affect the high speed movement of the vehicle, and ultimately affect its practicality. Therefore, it is of great significance and value to research the improvement of battery life.

SUMMARY OF THE INVENTION

Embodiments of the present application provide a battery cell, a battery, an electrical apparatus, and a method and a system for manufacturing a battery cell, which can improve the service life of the battery.

In a first aspect, there is provided a battery cell comprising: a case having an opening; an electrode assembly provided within the case; an end cover assembly for closing the opening, wherein the end cover assembly comprises an end cover, an insulating member and a connection adapter member, the end cover is provided with an electrode terminal, and is configured to cover the opening and is connected to the case, the insulating member is provided on one side of the end cover facing the electrode assembly, and the connection adapter member is used for being electrically connected to the electrode terminal and to the electrode assembly; and a buffer member provided on one side of the insulating member facing the electrode assembly, wherein the buffer member is pressed against the connection adapter member for buffering connection adapter member when the battery cell vibrates.

According to the technical solutions of the embodiments of the present application, by providing the buffer member on one side of the insulating member facing the electrode assembly, and the buffer member being pressed against the connection adapter member, on the one hand, the connection failure between the connection adapter member and the electrode assembly is avoided, and on the other hand, the impact force exerted by the electrode assembly on the connection adapter member when the battery cell vibrates is effectively relieved, so that the failure of the electric connection between the electrode terminal and the electrode assembly due to the fatigue fracture of the connection adapter member is avoided, and the service life of the battery is improved.

In some embodiments, the connection adapter member comprises a first connection adapter part and a second connection adapter part in a folded state, the second connection adapter part is located on one side of the first connection adapter part facing the electrode assembly, the first connection adapter part is electrically connected to the electrode terminal, the second connection adapter part is electrically connected to the electrode assembly, and the buffer member is pressed against the second connection adapter part.

In the above-mentioned technical solution, the buffer member is pressed against the second connection adapter part, and the second connection adapter part is connected to the electrode assembly, which is beneficial to reducing the possibility of the connection between the second connection adapter part and the electrode assembly being disconnected due to the movement of the second connection adapter part relative to the electrode assembly, and at the same time, the buffer member can effectively relieve the impact force exerted by the electrode assembly on the second connection adapter part when the battery cell vibrates, so that the fatigue fracture of the connection adapter member is avoided, and the service life of the battery is improved.

In some embodiments, the insulating member comprises an insulating body and an extension portion which are connected to each other, the insulating body is configured to be connected to the end cover, the extension portion extends and protrudes from one side of the insulating body facing the electrode assembly and forms a concave portion recessed in a direction away from the electrode assembly, and the connection adapter member is at least partially accommodated in the concave portion.

In the above-mentioned technical solution, on the one hand, when assembling the battery cell, the extension portion can guide the end cover to cover the opening of the case, and on the other hand, the extension portion can form a protective isolation for the connection adapter member, and avoid the possibility of short circuit of the battery cell caused by contact with the case.

In some embodiments, the extension portion is a closed ring structure which extends continuously or an annular structure with a notch.

In the above-mentioned technical solution, where the extension portion is a closed ring structure which extends continuously, the extension portion can form a protective isolation for the connection adapter member, which is beneficial to further improving the isolation effect; and where the extension portion is an annular structure with a notch, the notch of the extension portion can provide an avoidance space for the connection adapter member when it is in an unfolded state, which can reduce the processing procedures of the connection adapter member.

In some embodiments, the buffer member is attached to one side of the insulating body facing the electrode assembly.

In the above-mentioned technical solution, the buffer member is attached to the side of the insulating body facing the electrode assembly to facilitate the installation of the buffer member.

In some embodiments, the material of the buffer member is an elastomeric material or a foamed material.

In the above-mentioned technical solution, the contact of the buffer member with the second connection adapter part is an elastic contact, so that the failure of the electric connection between the electrode terminal and the electrode assembly due to the fatigue fracture of the connection adapter member is avoided, and the service life of the battery is improved.

In some embodiments, the material of the buffer member comprises one or more of polypropylene, pearl wool, polyurethane foam and fluororubber.

In the above-mentioned technical solution, the contact of the buffer member made of the above-mentioned material with the second connection adapter part is an elastic contact, so that the fatigue fracture of the connection adapter member is avoided.

In some embodiments, at least a part of the insulating body is recessed in a direction away from the end cover, so as to protrude on the side of the insulating body facing the electrode assembly to form the buffer member.

In the above-mentioned technical solution, on the one hand, the buffer member can be integrally molded with the insulating body, so that the installation of the buffer member is omitted, and the assembling steps are simplified; and on the other hand, the buffer member is formed by the insulating body being recessed in a direction away from the end cover, so that the buffer member can maintain a certain elasticity, and the contact of the buffer member with the second connection adapter part is an elastic contact, thus avoiding the fatigue fracture of the connection adapter member.

In some embodiments, the buffer member is configured to be composed of at least one protrusion protruding on the side of the insulating body facing the electrode assembly.

In the above-mentioned technical solution, a buffer member composed of at least one protrusion protruding on the side of the insulating body facing the electrode assembly is used, which both maintains the elasticity of the buffer member and provides the buffer member with a certain strength, so that the buffer member can be pressed against the second connection adapter part to avoid the movement of the electrode assembly relative to the position of the end cover assembly.

In a second aspect, there is provided a battery comprising: the battery cell of the first aspect.

In a third aspect, there is provided an electrical apparatus comprising: the battery of the second aspect for providing electric energy.

In a fourth aspect, there is provided a method for manufacturing a battery cell, comprising:

providing a case having an opening;
　　providing an electrode assembly;
　　providing an end cover assembly having an end cover, an insulating member and a connection adapter member, wherein the end cover is provided with an electrode terminal;
　　providing a buffer member;
　　placing the electrode assembly into the case;
　　connecting the buffer member to the insulating member;
　　electrically connecting the connection adapter member to the electrode terminal and to the electrode assembly, respectively; and
　　covering the opening with the end cover, with the end cover being connected to the case;
　　wherein the insulating member is provided on one side of the end cover facing the electrode assembly, the buffer member is provided on one side of the insulating member facing the electrode assembly, and the buffer member is pressed against the connection adapter member.

In a fifth aspect, there is provided a manufacturing system for a battery cell, comprising:

a first providing means for providing a case having an opening;
　　a second providing means for providing an electrode assembly;
　　a third providing means for providing an end cover assembly having an end cover, an insulating member and a connection adapter member, wherein the end cover is provided with an electrode terminal;
　　a fourth providing means for providing a buffer member; and
　　an assembling means for placing the electrode assembly into the case; connecting the buffer member to the insulating member; electrically connecting the connection adapter member to the electrode terminal and to the electrode assembly, respectively; and covering the opening with the end cover, with the end cover being connected to the case;
　　wherein the insulating member is provided on one side of the end cover facing the electrode assembly, the buffer member is provided on one side of the insulating member facing the electrode assembly, and the buffer member is pressed against the connection adapter member.

DESCRIPTION OF DRAWINGS

In order to illustrate the technical solutions of the embodiments of the present application more clearly, a brief introduction will be given below to the drawings to be used in the embodiments of the present application; it is apparent that the drawings depicted below are only for some embodiments of the present application, and for those of ordinary skill in the art, other drawings can be obtained from these drawings without involving creative efforts.

Figure 1:
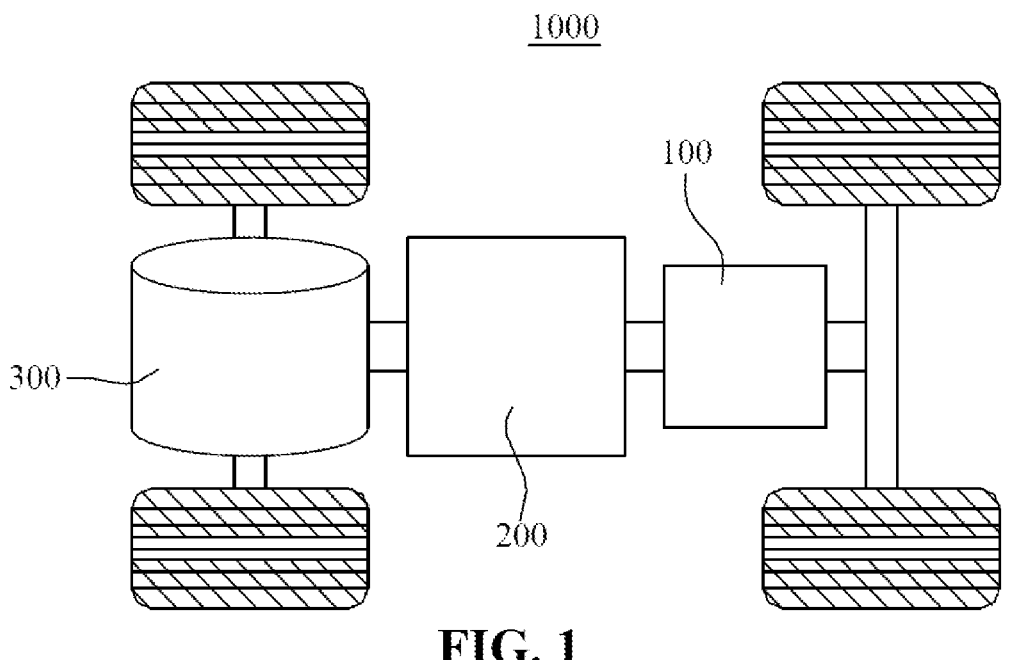
FIG. 1 is a schematic structural view of a vehicle according to some embodiments of the present application.

In the drawings, the drawings are not drawn to actual scale.

DESCRIPTION OF REFERENCE NUMERALS

10—Box body; 11—First portion; 12—Second portion; 13—Accommodating space;
20—Battery cell;
21—Case; 211—Opening;
22—Electrode assembly;
23—End cover assembly; 231—End cover; 232—Insulating member; 2321—Insulating body; 2322—Extension portion; 23221—Notch; 2323—Concave portion; 233—Electrode terminal; 2331—Rivet post; 234—Connection adapter member; 2341—First connection adapter part; 2342—Second connection adapter part;
24—Buffer member; 241—Protrusion; 2411—Side edge portion;
100—Battery; 200—Controller; 300—Motor;
1000—Vehicle;
2000—Manufacturing system; 2100—First providing means; 2200—Second providing means; 2300—Third providing means; 2400—Fourth providing means; 2500—Assembling means.

DETAILED DESCRIPTION

In order to make the objects, technical solutions and advantages of the embodiments of the present application clearer, the technical solutions of the embodiments of the present application will be clearly described below in connection with the drawings in the embodiments of the present application, and it is clear that the embodiments described are part of the embodiments of the present application, but not all of them. Based on the embodiments in the present application, all other embodiments obtained by those of ordinary skill in the art without involving creative efforts shall fall within the scope of protection of the present application.

Unless defined otherwise, all technical and scientific terms used in the present application have the same meanings as commonly understood by those skilled in the art to which the present application belongs; the terms used in the specification of the present application are only for the purpose of describing specific embodiments, and are not intended to limit the present application; the terms "comprising" and "having" and any variations thereof in the specification and the claims of the present application as well as in the foregoing description of the drawings are intended to encompass non-exclusive inclusions. The terms "first", "second" and the like in the specification and the claims of the present application as well as in the above drawings are used for distinguishing between different objects, rather than for describing a particular order or a primary and secondary relation.

Reference in the present application to "an embodiment" means that a particular feature, structure or characteristic described in connection with the embodiment may be comprised in at least one embodiment of the present application. The presence of the phrase in various places in the specification does not necessarily mean the same embodiment, nor does it mean a separate or alternative embodiment mutually exclusive with other embodiments.

In the description of the present application, it is to be noted that, unless otherwise expressly specified and restricted, the terms "installed", "linked", "connected" and "attached" should be understood in a broad sense, for example, as a fixed connection, or as a detachable connection, or as an integral connection; alternatively as a direct connection or as an indirect connection through an intermediate medium, or as an internal communication between two elements. For those of ordinary skill in the art, the specific meanings of the above terms in the present application can be understood according to specific situations.

In the embodiments of the present application, the same reference numerals denote the same components, and for the sake of brevity, detailed descriptions of the same components are omitted in different embodiments. It should be understood that the thickness, length, width and other sizes of various components in the embodiments of the present application as well as the overall thickness, length, width and other sizes of integrated apparatuses shown in the drawings are only illustrative, and should not constitute any limitation to the present application.

The "a plurality of" appearing in the present application refers to more than two (including two).

In the present application, the battery cell may include a lithium-ion secondary battery, a lithium-ion primary battery, a lithium-sulfur battery, a sodium-lithium-ion battery, a sodium-ion battery, or a magnesium-ion battery, etc., which are not limited in the embodiments of the present application. The battery cell may have a shape of cylinder, flat body, rectangular parallelepiped or other shapes, which are not limited either in the embodiments of the present application. Battery cells are generally divided into three types according to the encapsulating mode: cylindrical battery cell, square battery cell and soft pack battery cell, which are not limited either in the embodiments of the present application.

The battery mentioned in the embodiments of the present application refers to a single physical module comprising one or more battery cells for providing higher voltage and capacity. For example, the battery mentioned in the present application may include a battery module or a battery pack, etc. The battery generally comprises a box body for encapsulating one or more battery cells. The box body can prevent liquids or other foreign matter from affecting the charging or discharging of the battery cells.

The battery cell comprises an electrode assembly and an electrolyte solution, wherein the electrode assembly is composed of a positive electrode sheet, a negative electrode sheet and a separator. The battery cell mainly relies on the movement of metal ions between the positive electrode sheet and the negative electrode sheet to work. The positive electrode sheet comprises a positive electrode current collector and a positive electrode active material layer, wherein the positive electrode active material layer is coated on the surface of the positive electrode current collector, the portion of the positive electrode current collector not coated with the positive electrode active material layer protrudes from the portion of the positive electrode current collector already coated with the positive electrode active material layer, and the portion of the positive electrode current collector not coated with the positive electrode active material layer serves as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet comprises a negative electrode current collector and a negative electrode active material layer, wherein the negative electrode active material layer is coated on the surface of the negative electrode current collector, the portion of the negative electrode current collector not coated with the negative electrode active material layer protrudes from the portion of the negative electrode current collector already coated with the negative electrode active material layer, and the portion of the negative electrode current collector not coated with the negative electrode active material layer serves as a negative tab. The material of the negative electrode current collector may be copper, and the negative electrode active material may be carbon, silicon, or the like. In order to ensure that a large current is passed without fusing, there are a plurality of positive tabs which are laminated together, and there are a plurality of negative tabs which are laminated together. In addition, the electrode assembly may have a wound structure or a laminated structure, which are not limited in the embodiments of the present application.

At present, a battery cell generally comprises a case, an electrode assembly, and an end cover assembly which covers an opening of the case to provide an enclosed space for the electrode assembly and the electrolyte solution. For a typical battery cell, the end cover of the end cover assembly needs to be electrically connected to the electrode assembly through a connection adapter member in order for the end cover to act as an output electrode (positive output electrode or negative output electrode) of the battery cell.

The inventors have found that during the use of the battery cell, such as in a vehicle, the battery cell may vibrate when the vehicle is running, and the electrode assembly may be displaced relative to the end cover assembly during the vibration of the battery cell; since the connection adapter member is in a folded state, the connection adapter member is prone to fatigue fracture failure, resulting in that the end cover cannot be electrically connected to the electrode assembly normally, and thus the battery cell cannot be normally used, affecting the service life of the battery.

In view of this, the embodiments of the present application provide a technical solution, in which a battery cell comprises a case, an electrode assembly, an end cover assembly and a buffer member, wherein the end cover assembly comprises an end cover, an insulating member and a connection adapter member, the end cover is provided with an electrode terminal, the end cover is configured to cover an opening of the case and is connected to the case, the insulating member is provided on one side of the end cover facing the electrode assembly, the connection adapter member is used for being electrically connected to the electrode terminal and to the electrode assembly, the buffer member is provided on one side of the insulating member facing the electrode assembly, and the buffer member is pressed against the connection adapter member for buffering connection adapter member when the battery cell vibrates, so that the impact force on the connection adapter member when the battery cell vibrates is relieved, thereby avoiding fatigue fracture of the connection adapter member and improving the service life of the battery.

The technical solution described in the embodiments of the present application is applicable to batteries as well as electrical apparatuses.

The electrical apparatus may be a vehicle, a mobile phone, a portable device, a laptop, a ship, a spacecraft, an electric toy and an electric tool, etc. The vehicle may be a fuel vehicle, a gas vehicle or a new energy vehicle, and the new energy vehicle may be an all-electric vehicle, a hybrid vehicle, an extended-range vehicle, and the like; the spacecraft includes an airplane, a rocket, a space shuttle, a spaceship, and the like; the electric toy includes a stationary electric toy or a mobile electric toy, such as a game machine, an electric car toy, an electric boat toy, an electric airplane toy, and the like; and the electric tool includes a metal cutting electric tool, a grinding electric tool, an assembling electric tool and a railway electric tool, such as an electric drill, an electric grinder, an electric wrench, an electric screwdriver, an electric hammer, an impact electric drill, a concrete vibrator, an electric planer, and the like. The above-mentioned electrical apparatuses are not specially limited in the embodiments of the present application.

For convenience of description, the following embodiments are illustrated by taking a vehicle 1000 as an example of the electrical apparatus according to an embodiment of the present application.

Referring to FIG. 1, which is a schematic structural view of a vehicle 1000 according to some embodiments of the present application, in which a battery 100 is provided inside the vehicle 1000, and the battery 100 can be provided at the bottom or the head or the rear of the vehicle 1000. The battery 100 can be used to power the vehicle 1000, for example, the battery 100 can be used as an operating power source for the vehicle 1000.

The vehicle 1000 may further comprise a controller 200 and a motor 300, and the controller 200 is used to control the battery 100 to power the motor 300, e.g. for the operating power demand of the vehicle 1000 during start-up, navigation and driving.

In some embodiments, the battery 100 can be used not only as the operating power source for the vehicle 1000, but also as a driving power source for the vehicle 1000 to replace or partially replace fuel or natural gas to provide driving power for the vehicle 1000.

Figure 2:
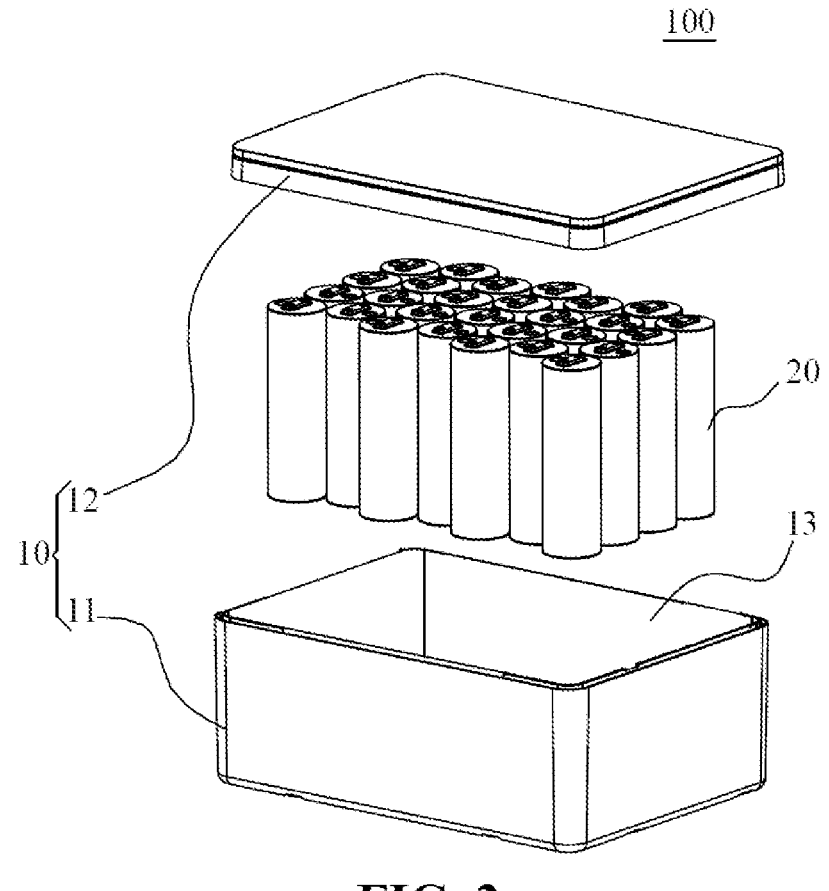
FIG. 2 is a schematic structural view of a battery according to some embodiments of the present application.

In some embodiments, referring to FIG. 2, which is a schematic structural view of a battery 100 according to some embodiments of the present application, in which the battery 100 comprises a box body 10 and a battery cell 20 accommodated within the box body 10.

The box body 10 may be of various shapes, such as a cylinder, a rectangular parallelepiped, and the like. Of course, the box body 10 can have various structures.

In some embodiments, the box body 10 may comprise a first portion 11 and a second portion 12, the first portion 11 and the second portion 12 are covered with each other to define an accommodating space 13 for accommodating the battery cell 20. Of course, the junction of the first portion 11 and the second portion 12 can be sealed by a sealing member, which may be a sealing ring, a sealing glue, and the like.

The first portion 11 and the second portion 12 may be of various shapes, such as for example, a rectangular parallelepiped, a cylinder, and the like. The first portion 11 may be of a hollow structure with one side open, and the second portion 12 may also be of a hollow structure with one side open, and the open side of the second portion 12 covers the open side of the first portion 11 to form the box body 10 having the accommodating space 13. Of course, it is also possible that the first portion 11 is of a hollow structure with one side open, the second portion 12 is of a plate-like structure, and the second portion 12 covers the open side of the first portion 11 to form the box body 10 having the accommodating space 13.

In the battery 100, there may be one or more battery cells 20. If there are a plurality of battery cells 20, the plurality of battery cells 20 may be connected in series or parallel or in a mixed connection, wherein the mixed connection means that the plurality of battery cells 20 are connected in both series and parallel. It is possible that a plurality of battery cells 20 are first connected in series or parallel or in mixed connection to form a battery module, and then a plurality of battery modules are connected in series or parallel or in mixed connection to form an integral body, which is accommodated within the box body 10. It is also possible that all of the battery cells 20 are directly connected together in series or parallel or in mixed connection, and then an integral body formed by all of the battery cells 20 is accommodated within the box body 10. The battery cell 40 may be of a cylindrical structure or a square structure having six faces, and the outer shapes and structures of the battery cells 40 are not limited here. In the embodiments of the present application, the battery cell 40 is exemplarily illustrated as having a cylindrical structure.

Figure 3:
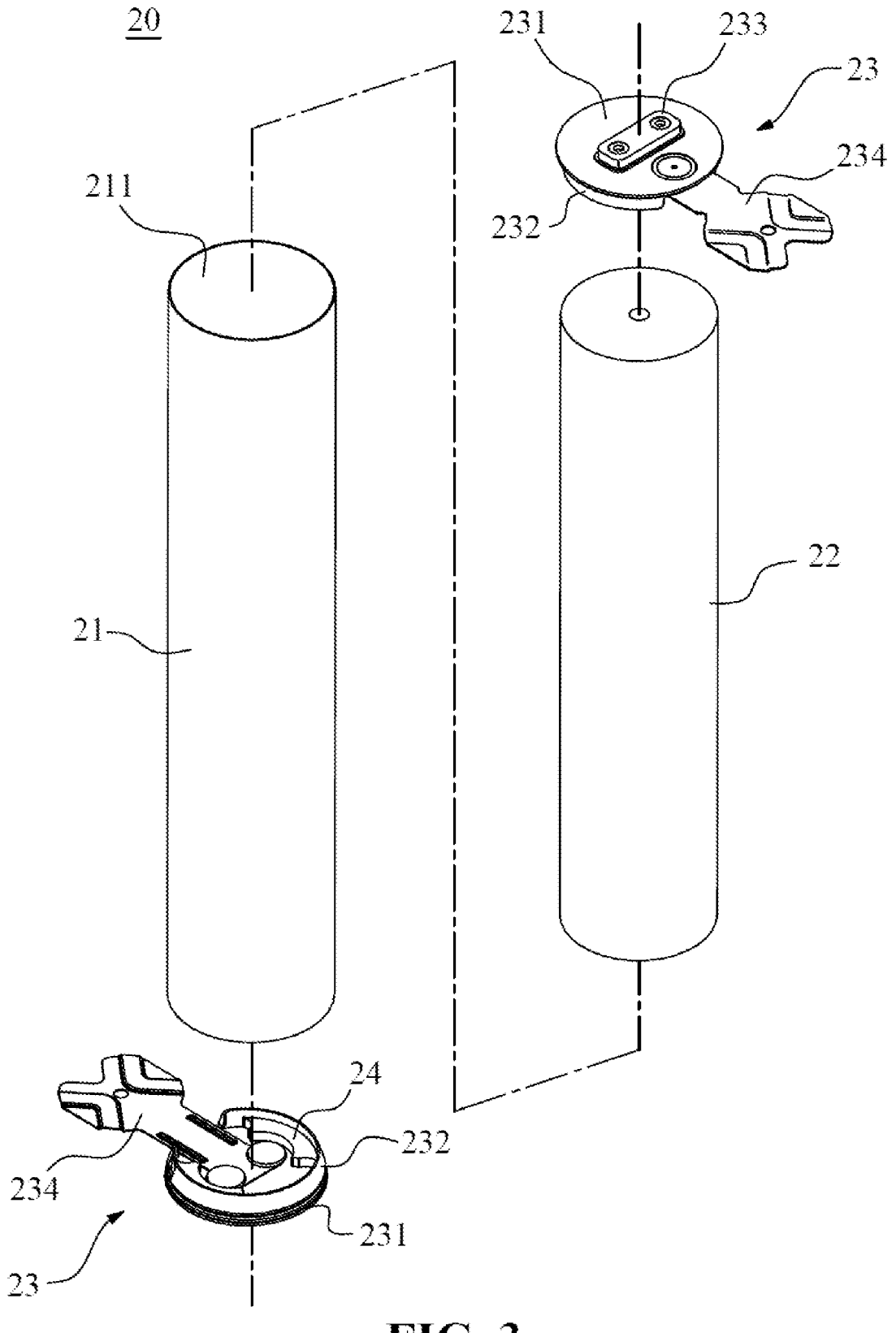
FIG. 3 is an exploded view of a battery cell according to some embodiments of the present application.

Referring to FIG. 3, which is an exploded view of a battery cell 20 according to some embodiments of the present application, wherein a connection adapter member 234 is in an unfolded state, and the battery cell 20 may comprise a case 21, an electrode assembly 22 and an end cover assembly 23. The case 21 has an opening 211, the electrode assembly 22 is accommodated within the case 21, and the end cover assembly 23 is used for covering the opening 211.

The case 21 may be of various shapes, such as for example, a cylinder, a rectangular parallelepiped, and the like. The shape of the case 21 can be determined according to the specific shape of the electrode assembly 22. For example, if the electrode assembly 22 has a cylindrical structure, the case 21 may be chosen as having a cylindrical structure; and if the electrode assembly 22 has a structure of rectangular parallelepiped, the case 21 may be chosen as having a structure of rectangular parallelepiped.

Exemplarily, in FIG. 3, the case 21 is of a hollow cylindrical structure with both ends open.

There are various materials for the case 21, such as for example, plastic, copper, iron, aluminum, stainless steel, aluminum alloy, and the like, which are not particularly limited in the embodiments of the present application.

The end cover assembly 23 comprises an end cover 231, an insulating member 232, an electrode terminal 233, and a connection adapter member 234. The end cover 231 is configured to cover the opening 211 of the case 21 and is connected to the case 21. For example, the end cover 231 can be connected to the case 21 by welding. The insulating member 232 and the electrode terminal 233 are both provided on the end cover 231. The insulating member 232 is provided on one side of the end cover 231 near the inside of the case 21. The electrode terminal 233 is electrically connected to the electrode assembly 22 through the connection adapter member 234. In some examples, the number of the end cover assemblies 23 is two. Each of two opposite ends of the electrode assembly 22 is correspondingly provided with one end cover assembly 23. The case 21 has two opposite openings 211. Two end covers 231 respectively cover the two openings 211 and are both connected to the case 21.

Figure 4:
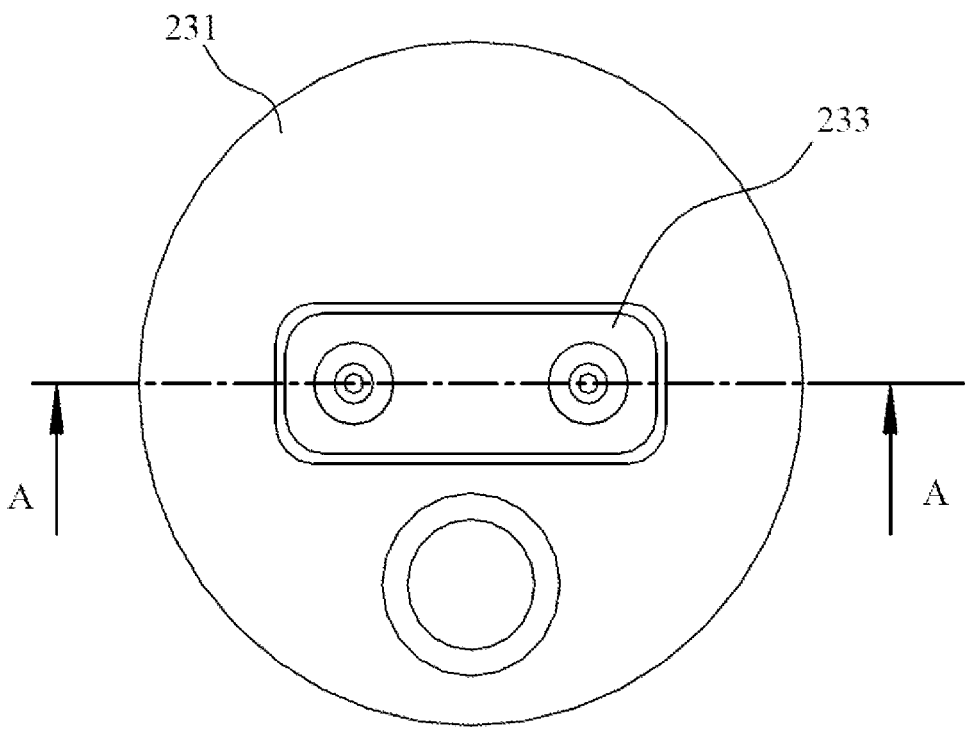
FIG. 4 is a schematic structural top view of a battery cell according to some embodiments of the present application.
Figure 5:
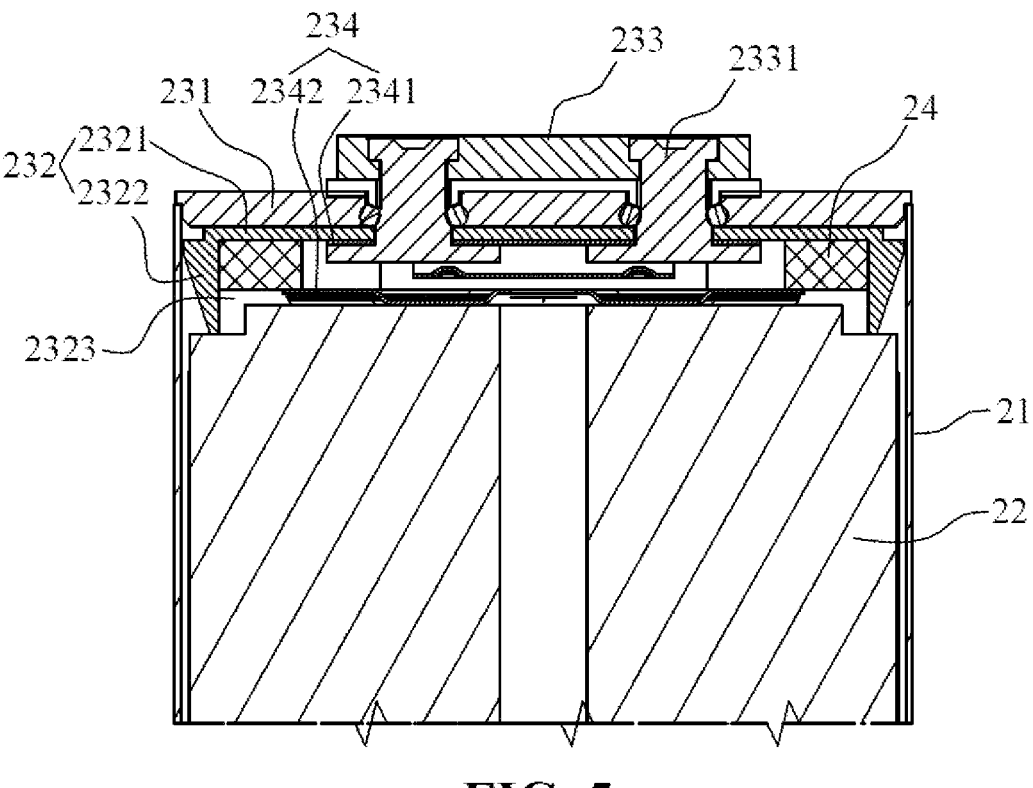
FIG. 5 is a schematic structural sectional view taken along A-A in FIG. 4.

In the embodiments of the present application, referring to FIG. 4 and FIG. 5, in which FIG. 4 is a schematic structural top view of a battery cell 20 according to some embodiments of the present application, and FIG. 5 is a schematic structural sectional view taken along A-A in FIG. 4, the battery cell 20 according to the embodiments of the present application comprises a case 21, an electrode assembly 22, an end cover assembly 23 and a buffer member 24, wherein the case 21 has an opening 211, the electrode assembly 22 is provided within the case 21, the end cover assembly 23 is used for enclosing the opening 211, and the end cover assembly 23 comprises an end cover 231, an insulating member 232 and a connection adapter member 234; an electrode terminal 233 is provided on the end cover 231, the end cover 231 is configured to cover the opening 211 and is connected to the case 21, the insulating member 232 is provided on one side of the end cover 231 facing the electrode assembly 22, and the connection adapter member 234 is used for being electrically connected to the electrode terminal 233 and to the electrode assembly 22. The buffer member 24 is provided on one side of the insulating member 232 facing the electrode assembly 22, and the buffer member 24 is pressed against the connection adapter member 234 for buffering connection adapter member 234 when the battery cell 20 vibrates.

The end cover 231 is connected to the case 21 to enclose the electrode assembly 22 within the case 21. The insulating member 232 can isolate the electrode assembly 22 from the end cover 231. The buffer member 24 is provided on the side of the insulating member 232 facing the electrode assembly 22, the connection adapter member 234 is connected to the electrode assembly 22, the buffer member 24 and the electrode assembly 22 are jointly pressed against at least a part of the connection adapter member 234, so that the connection adapter member 234 is not easily moved in position relative to the electrode assembly 22, which is beneficial to reducing the possibility of the connection between the connection adapter member 234 and the electrode assembly 22 being disconnected due to the movement of the connection adapter member 234 relative to the electrode assembly 22. At the same time, the buffer member 24 also causes that the electrode assembly 22 is not easily moved in position relative to the end cover assembly 23, thus avoiding the possibility that when the battery cell 20 vibrates, the electrode assembly 22 moves relative to the end cover assembly 23 and exerts an impact force on the connection adapter member 234 to result in a fatigue fracture zone on the connection adapter member 234.

It should be noted that exemplarily, there may be two buffer members 24, symmetrically distributed on both sides of the connection adapter member 234 for being pressed against the connection adapter member 234, and of course, it is also possible to provide a plurality of buffer members 24 on each side of the connection adapter member 234.

According to the technical solutions of the embodiments of the present application, by providing the buffer member 24 on one side of the insulating member 232 facing the electrode assembly 22, and the buffer member 24 being pressed against the connection adapter member 234, on the one hand, the connection failure between the connection adapter member 234 and the electrode assembly 22 is avoided, and on the other hand, the impact force exerted by the electrode assembly 22 on the connection adapter member when the battery cell 20 vibrates is effectively relieved, so that the failure of the electric connection between the electrode terminal 233 and the electrode assembly 22 due to the fatigue fracture of the connection adapter member 234 is avoided, and the service life of the battery is improved.

In some embodiments, with continued reference to FIG. 5, the connection adapter member 231 comprises a first connection adapter part 2341 and a second connection adapter part 2342 in a folded state, the second connection adapter part 2342 is located on one side of the first connection adapter part 2341 facing the electrode assembly 22, the first connection adapter part 2341 is electrically connected to the electrode terminal 233, the second connection adapter part 2345 is electrically connected to the electrode assembly 22, and the buffer member 234 is pressed against the second connection adapter part 2342.

The connection adapter member 231 is connected to the electrode terminal 233 through the first connection adapter part 2341. For example, the first connection adapter part 2341 is connected to the electrode terminal 233 through a rivet post 2331. The connection adapter member 231 is connected to the electrode assembly 22 through the second connection adapter part 2342. For example, the second connection adapter part 2342 is connected to the electrode assembly 22 by welding. When assembling the battery cell 20, the second connection adapter part 2342 is bent with respect to the first connection adapter part 2341, so that after the assembly of the battery cell 20 is completed, the first connection adapter part 2341 and the second connection adapter part 2342 are in a folded state.

The buffer member 24 is pressed against the second connection adapter part 2342, the second connection adapter part 2342 is connected to the electrode assembly 22, and the buffer member 24 and the electrode assembly 22 are jointly pressed against the second connection adapter part 2342, so that the second connection adapter part 2342 is not easily moved in position relative to the electrode assembly 22, which is beneficial to reducing the possibility of the connection between the second connection adapter part 2342 and the electrode assembly 22 being disconnected due to the movement of the second connection adapter part 2342 relative to the electrode assembly 22. At the same time, the buffer member 24 can effectively relieve the impact force exerted by the electrode assembly 22 on the second connection adapter part 2342 when the battery cell 20 vibrates, thus avoiding fatigue fracture of the connection adapter member 234 and improving the service life of the battery.

In some embodiments, with continued reference to FIG. 5, the insulating member 232 comprises an insulating body 2321 and an extension portion 2322 which are connected to each other, the insulating body 2321 is configured to be connected to the end cover 231, the extension portion 2322 extends and protrudes from one side of the insulating body 2321 facing the electrode assembly 22 and forms a concave portion 2323 recessed in a direction away from the electrode assembly 22, and the connection adapter member 234 is at least partially accommodated in the concave portion 2323.

The insulating member 232 is connected to the end cover 231 through the insulating body 2321. The insulating member 232 can be connected and fixed to the end cover 231 in advance through the insulating body 2321, and then the end cover 231 with the insulating member 232 is assembled with the case 21. On the one hand, since the insulating member 232 has the extension portion 2322, when assembling the battery cell 20, the extension portion 2322 can guide the end cover 231 to cover the opening 211 of the case 21. On the other hand, the connection adapter member 234 is at least partially accommodated in the concave portion 2323, and exemplarily as shown in FIG. 5, the connection adapter member 234 is accommodated in the concave portion 2323, and the extension portion 2322 can form a protective isolation for the connection adapter member 234, thus avoiding the possibility of short circuiting of the battery cell 20 caused by contact with the case 21.

It should be noted that, in some embodiments, the extension portion 2322 can be pressed against the electrode assembly 22, and acts jointly with the buffer member 24, so that the electrode assembly 22 is not easily moved in position relative to the end cover assembly 23. In some other embodiments, the extension portion 2322 may not be pressed against the electrode assembly 22, but instead is pressed through the buffer member 24 against the second connection adapter part 2342 to avoid the positional movement of the electrode assembly 22 relative to the end cover assembly 23.

Figure 6:
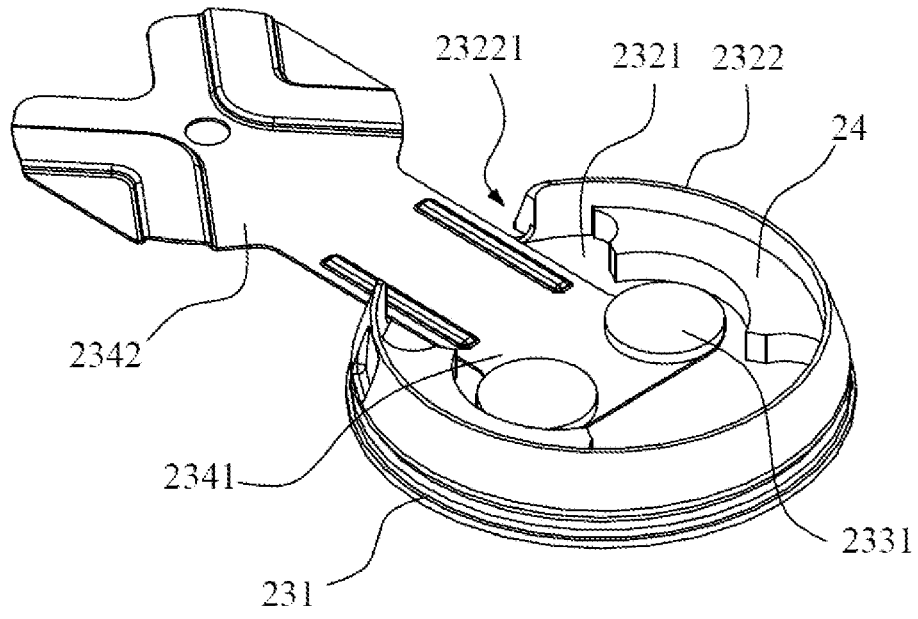
FIG. 6 is a schematic structural view of an end cover assembly according to some embodiments of the present application.
Figure 7:
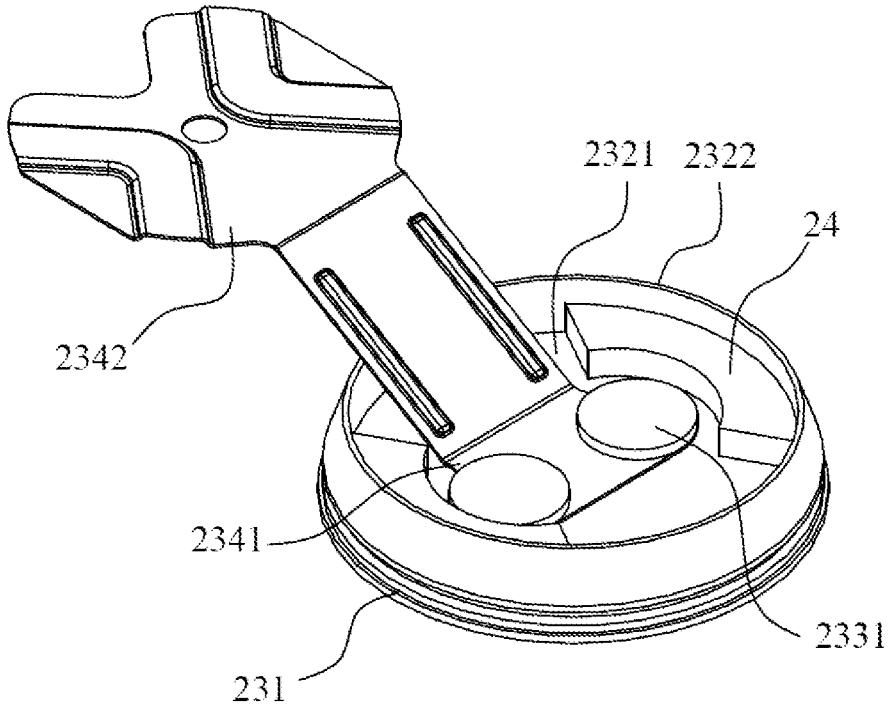
FIG. 7 is a schematic structural view of an end cover assembly according to some other embodiments of the present application.

In some embodiments, referring to FIG. 6 and FIG. 7, in which FIG. 6 is a schematic structural view of an end cover assembly 23 according to some embodiments of the present application; FIG. 7 is a schematic structural view of an end cover assembly 23 according to some other embodiments of the present application; and the extension portion 2322 is a closed ring structure which extends continuously or an annular structure with a notch 23221.

In some embodiments, FIG. 6 schematically shows a state in which the connection adapter member 234 is connected to the electrode terminal 233 while the connection adapter member 234 is not bent. Where the extension portion 2322 is an annular structure with a notch 23221, the notch 23221 of the extension portion 2322 enables avoidance of the connection adapter member 234 in an unfolded state. The connection adapter member 234 can pass through the notch 23221, so that during the processing and manufacturing of the connection adapter member 234, the first connection adapter part 2341 and the second connection adapter part 2342 of the connection adapter member 234 maintain a flat state, and the processing procedures of the connection adapter member 234 can be reduced.

In some embodiments, FIG. 7 schematically shows a state in which the connection adapter member 234 is connected to the electrode terminal 233 while the connection adapter member 234 is not bent. Where the extension portion 2322 is a closed ring structure which extends continuously, the first connection adapter part 2341 and the second connection adapter part 2342 of the connection adapter member 234 need to be bent during processing and manufacturing, thus enabling the connection adapter member 234 to avoid the extension portion 2322 after the first connection adapter part 2341 is connected to the electrode terminal 233. Since the extension portion 2322 is a closed ring structure which extends continuously, a protective isolation can be formed for the connection adapter member 234 in a folded state, which is beneficial to further improving the isolation effect.

In some embodiments, with continued reference to FIG. 5 to FIG. 7, the buffer member 24 is attached to one side of the insulating body 2321 facing the electrode assembly 22. The buffer member 24 is attached to the insulating body 2321, wherein the attachment means that the buffer member 24 can be fixedly connected to or detachably connected to the insulating body 2321, and specifically, bonding or snap-fitting connection can be used. The buffer member 24 is attached to the side of the insulating body 2321 facing the electrode assembly 22, which facilitates the installation of the buffer member 24.

In some embodiments, the material of the buffer member 24 is an elastomeric material or a foamed material, so that the contact of the buffer member 24 with the second connection adapter part 2342 is an elastic contact, so that the failure of the electric connection between the electrode terminal 233 and the electrode assembly 22 due to the fatigue fracture of the connection adapter member 234 is avoided, and the service life of the battery is improved.

In some embodiments, the material of the buffer member 24 comprises one or more of polypropylene, pearl wool, polyurethane foam and fluororubber. The buffer member 24 can be prepared by selecting one or more of them according to design requirements, and the buffer member 24 is prepared by using one or more of polypropylene, pearl wool, polyurethane foam and fluororubber, so that the contact of the buffer member 24 with the second connection adapter part 2342 is an elastic contact, thus avoiding fatigue fracture of the connection adapter member 234.

Figure 8:
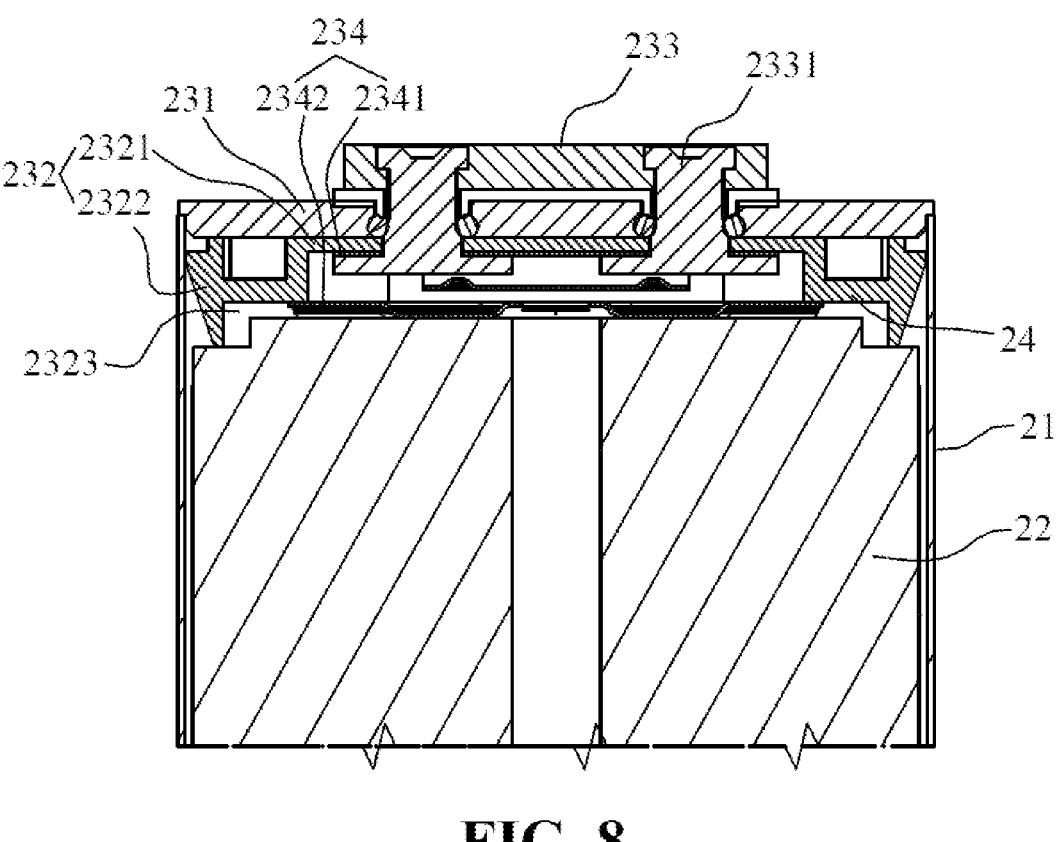
FIG. 8 is a schematic structural view of a battery cell according to some other embodiments of the present application corresponding to FIG. 5.

In some embodiments, referring to FIG. 8, which is a schematic structural view of a battery cell 20 according to some other embodiments of the present application corresponding to FIG. 5, in which at least a part of the insulating body 2321 is recessed in a direction away from the end cover 231, so as to protrude from the side of the insulating body 2321 facing the electrode assembly 22 to form the buffer member 24. The buffer member 24 is formed by the insulating body 2321 being recessed in the direction away from the end cover 231, and the buffer member 24 can be integrally formed with the insulating body 2321, so that the installation of the buffer member 24 is omitted, and the assembling procedures are simplified; the buffer member 24 protrudes from the side of the insulating body 2321 facing the electrode assembly 22, while on the side facing the end cover 231 is recessed in the direction away from the end cover 231, so that the buffer member 24 can maintain a certain elasticity, and the contact of the buffer member 24 with the second connection adapter part 2342 is an elastic contact, thus avoiding fatigue fracture of the connection adapter member 234.

Figure 9:
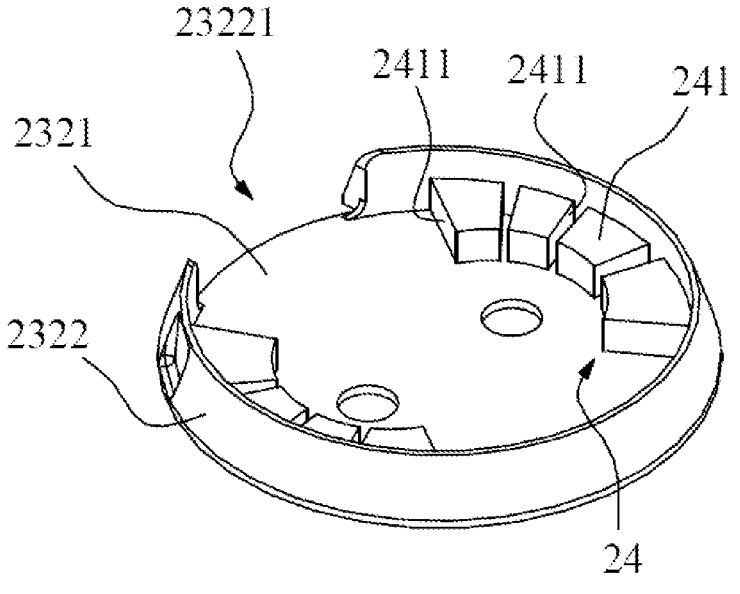
FIG. 9 is a schematic structural view of an insulating member according to some embodiments of the present application.

In some embodiments, referring to FIG. 9, which is a schematic structural view of an insulating member 232 according to some embodiments of the present application, in which the buffer member 24 is configured to be composed of at least one protrusion 241 protruding on the side of the insulating body 2321 facing the electrode assembly 22. Since a side portion 2411 of the protrusion 241 can function as a reinforcing rib, a buffer member 24 composed of a different number of protrusions 241 has a different number of side portions 2411, so that the elasticity of the buffer member 24 composed of a different number of protrusions 241 is different. A buffer member 24 composed of at least one protrusion 241 protruding on the side of the insulating body 2321 facing the electrode assembly 22 is used, which both maintains the elasticity of the buffer member 24 and provides the buffer member 24 with a certain strength, so that the buffer member 24 can be pressed against the second connection adapter part 2342 to avoid the movement of the electrode assembly 22 relative to the position of the end cover assembly 23.

Figure 10:
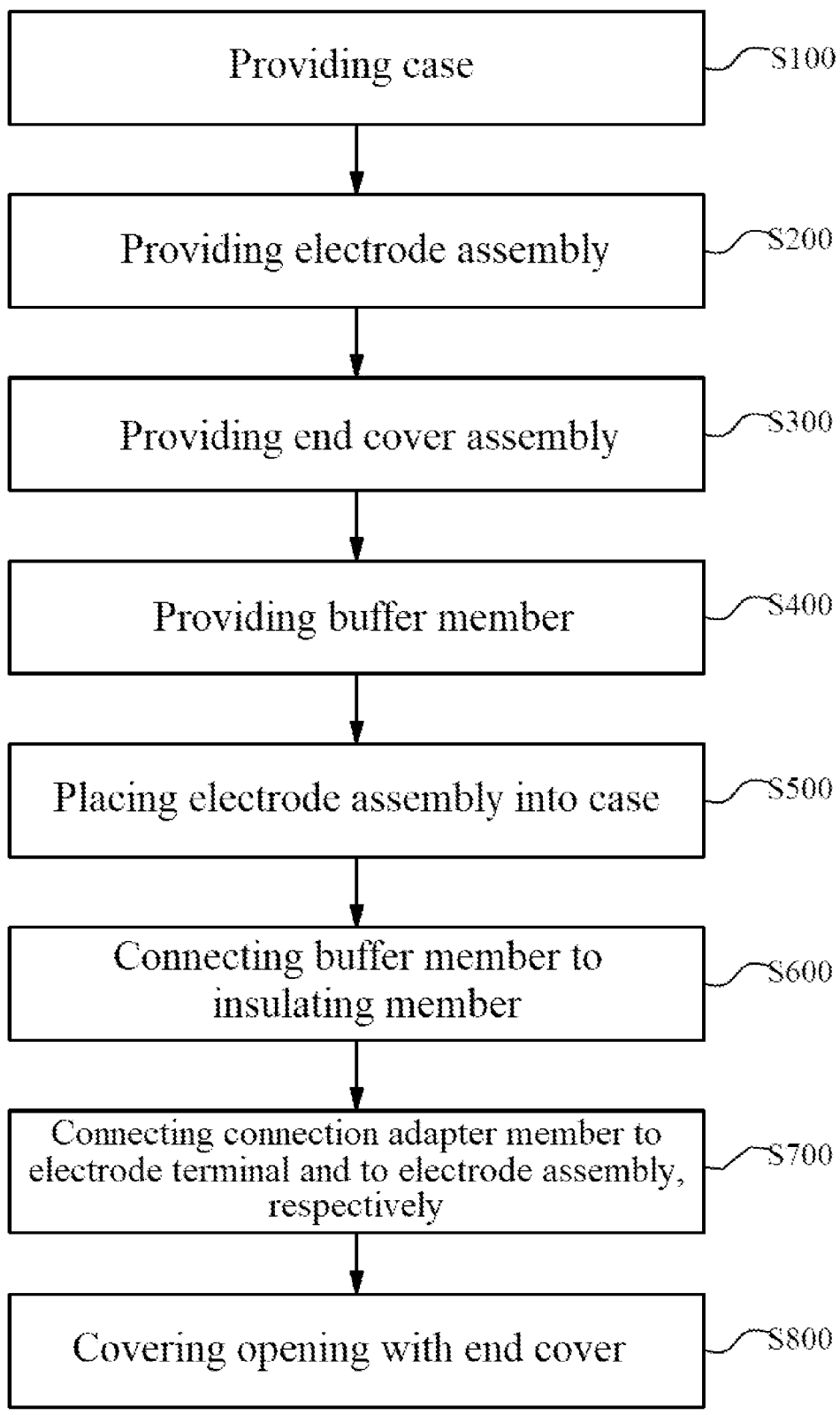
FIG. 10 is a schematic flowchart of a method for manufacturing a battery cell according to some embodiments of the present application.

Embodiments of the present application further provide a method for manufacturing a battery cell 20; referring to FIG. 10, which is a schematic flowchart of a method for manufacturing a battery cell 20 according to some embodiments of the present application, wherein the method for manufacturing a battery cell 20 comprises:

S100: providing a case 21 having an opening 211;

S200: providing an electrode assembly 22;

S300: providing an end cover assembly 23 having an end cover 231, an insulating member 232 and a connection adapter member 234, wherein the end cover 231 is provided with an electrode terminal 233;

S400: providing a buffer member 24;

S500: placing the electrode assembly 22 into the case 21;

S600: connecting the buffer member 24 to the insulating member 232;

S700: electrically connecting the connection adapter member 234 to the electrode terminal 231 and to the electrode assembly 22, respectively; and S800: covering the opening 211 with the end cover 231, with the end cover 231 being connected to the case 21;

wherein the insulating member 232 is provided on one side of the end cover 231 facing the electrode assembly 22, the buffer member 24 is provided on one side of the insulating member 232 facing the electrode assembly

22, and the buffer member 24 is pressed against the connection adapter member 234.

In the above method, the order of step S100, step S200, step S300 and step S400 is not limited, such as for example, step S400 may be performed first, then step S300 is performed, then step S200 is performed, and then step S100 is performed.

It should be noted that the related structures of the battery cells 20 manufactured by the manufacturing method provided in the above embodiments can be found in the battery cells 20 provided in the foregoing embodiments, and the details will not be repeated here.

Figure 11:
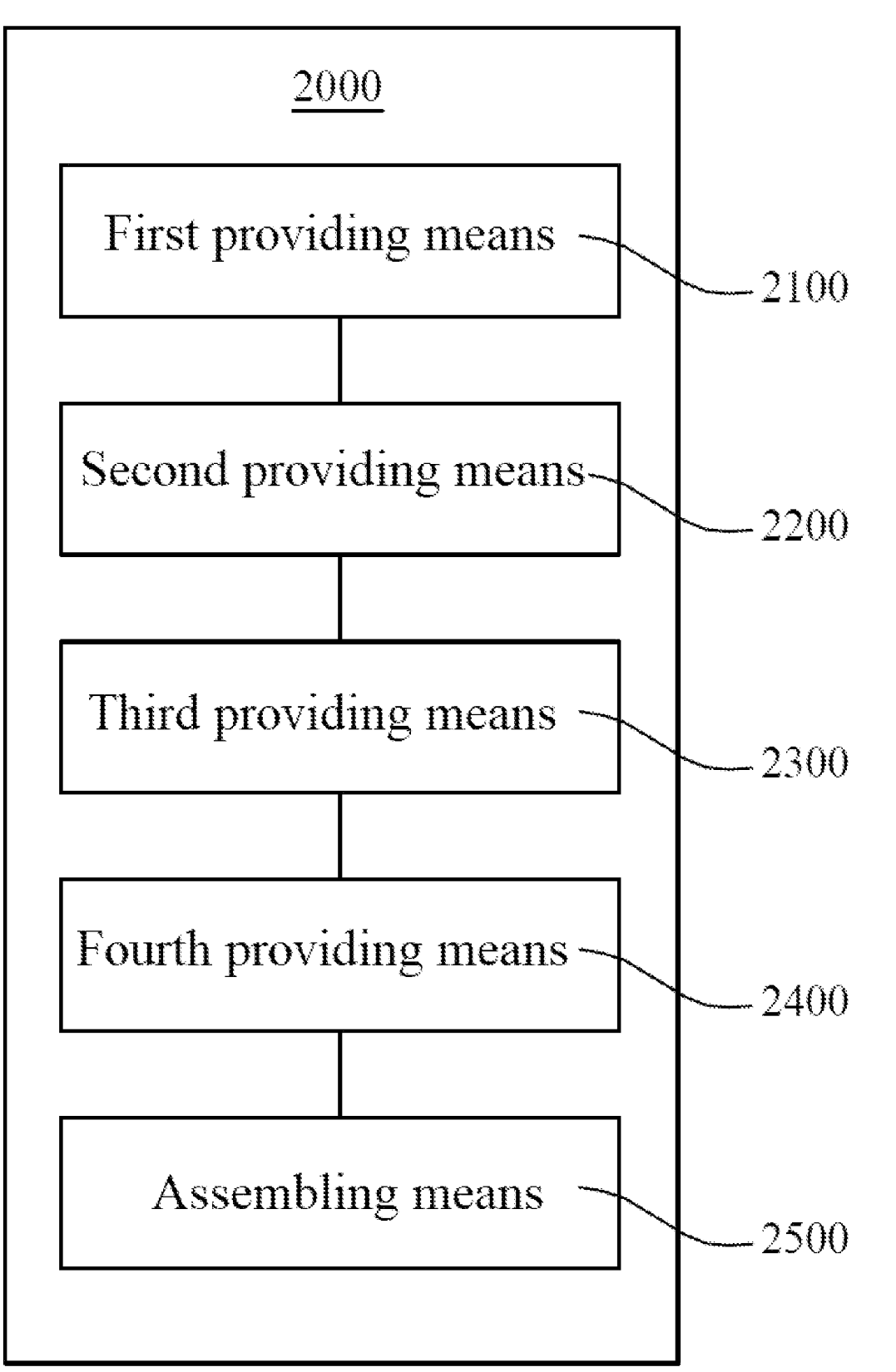
FIG. 11 is a schematic block diagram of a manufacturing system for a battery cell according to some embodiments of the present application.

Embodiments of the present application further provide a manufacturing system 2000 for a battery cell 20; referring to FIG. 11, which is a schematic block diagram of a manufacturing system for a battery cell according to some embodiments of the present application, and the manufacturing system 2000 for a battery cell 20 comprises:

a first providing means 2100 for providing a case 21 having an opening 211;

a second providing means 2200 for providing an electrode assembly 22;

a third providing means 2300 for providing an end cover assembly 23 having an end cover 231, an insulating member 232 and a connection adapter member 234, wherein the end cover 231 is provided with an electrode terminal 233;

a fourth providing means 2400 for providing a buffer member 24;

an assembling means 2500 for placing the electrode assembly 22 into the case 21; connecting the buffer member 24 to the insulating member 232; electrically connecting the connection adapter member 234 to the electrode terminal 231 and to the electrode assembly 22, respectively; and covering the opening 211 with the end cover 231, with the end cover 231 being connected to the case 21;

wherein the insulating member 232 is provided on one side of the end cover 231 facing the electrode assembly 22, the buffer member 24 is provided on one side of the insulating member 232 facing the electrode assembly 22, and the buffer member 24 is pressed against the connection adapter member 234.

It should be noted that the related structures of the battery cells 20 manufactured by the manufacturing system 2000 provided in the above embodiments can be found in the battery cells 20 provided in the foregoing embodiments, and the details will not be repeated here.

While the present application has been described with reference to the preferred embodiments, various improvements can be made and components therein can be replaced with equivalents without departing from the scope of the present application. In particular, the technical features mentioned in the various embodiments can be combined in any way as long as there are no structural conflicts. The present application is not limited to the particular embodiments disclosed herein, but rather includes all technical solutions falling within the scope of the claims.

The invention claimed is:

1. A battery cell comprising:

a case having an opening;

an electrode assembly provided within the case;

an end cover assembly for closing the opening, wherein the end cover assembly comprises an end cover, an insulating member, and a connection adapter member, the end cover is provided with an electrode terminal, and is configured to cover the opening and is connected to the case, the insulating member is provided on one side of the end cover facing the electrode assembly, and the connection adapter member is used for being electrically connected to the electrode terminal and to the electrode assembly; and a buffer member provided on one side of the insulating member facing the electrode assembly, wherein the buffer member is pressed against the connection adapter member for buffering the connection adapter member when the battery cell vibrates, wherein the insulating member comprises an insulating body and an extension portion which are connected to each other, the insulating body is configured to be connected to the end cover, the extension portion extends and protrudes from one side of the insulating body facing the electrode assembly and forms a concave portion recessed in a direction away from the electrode assembly, and the connection adapter member is at least partially accommodated in the concave portion, the extension portion is integrally formed with the insulating body and extends toward the electrode assembly to form a concave portion that at least partially surrounds and accommodates the connection adapter member, the extension portion being pressed directly against the electrode assembly and configured to act jointly with the buffer member to restrict movement of the electrode assembly relative to the end cover assembly.

2. The battery cell according to claim 1, wherein the connection adapter member comprises a first connection adapter part and a second connection adapter part in a folded state, the second connection adapter part is located on one side of the first connection adapter part facing the electrode assembly, the first connection adapter part is electrically connected to the electrode terminal, the second connection adapter part is electrically connected to the electrode assembly, and the buffer member is pressed against the second connection adapter part.

3. The battery cell according to claim 1, wherein the extension portion is a closed ring structure which extends continuously or an annular structure with a notch.

4. The battery cell according to claim 1, wherein the buffer member is attached to the side of the insulating body facing the electrode assembly.

5. The battery cell according to claim 4, wherein a material of the buffer member is an elastomeric material or a foamed material.

6. The battery cell according to claim 4, wherein the material of the buffer member comprises one or more of polypropylene, pearl wool, and polyurethane foam.

7. The battery cell according to claim 1, wherein at least a part of the insulating body is recessed in a direction away from the end cover, so as to protrude on the side of the insulating body facing the electrode assembly to form the buffer member.

8. The battery cell according to claim 7, wherein the buffer member is configured to be composed of at least one protrusion protruding on the side of the insulating body facing the electrode assembly.

9. A battery comprising the battery cell of claim 1.

10. An electrical apparatus comprising the battery according to claim 9, wherein the battery is for providing electric energy.

*   *   *   *   *